United States Patent Office 3,089,842
Patented May 14, 1963

3,089,842
PRODUCTION OF SULFONATED ASPHALT
Charles A. Stratton, Caney, Kans., assignor to Phillips Petroleum Company, a corporation of Delaware
No Drawing. Filed Dec. 14, 1959, Ser. No. 859,117
8 Claims. (Cl. 208—44)

This invention relates to the production of sulfonated asphalt. In another aspect, it relates to a process for sulfonating asphalt with liquid sulfur trioxide.

Many organic compounds have been sulfonated with various sulfonating agents such as concentrated sulfuric acid, oleum, and chlorosulfonic acid. While these sulfonation procedures are generally satisfactory when applied to single or simple mixtures of organic compounds, they are not generally satisfactory when applied to asphalt or asphaltic materials due to the complex chemical nature of these materials. The use of conventional sulfonating agents such as concentrated sulfuric acid and oleum in the sulfonation of asphaltic materials often results in uncontrolled sulfonation and gives rise to problems in the separation of the sulfonated product, as well as producing products of undesirable physical and chemical properties.

Accordingly, an object of this invention is to provide an improved process for producing sulfonated asphalt. Another object is to provide an improved process for sulfonating asphalt with a novel sulfonating agent, namely liquid sulfur trioxide. Another object is to sulfonate asphaltic materials with liquid sulfur trioxide to produce sulfonated asphalt products having desirable physical and chemical properties which makes the sulfonated asphalt products especially useful as fracturing fluid or drilling mud fluid-loss control additives. Other objects and advantages of this invention will become apparent to those skilled in the art from the following discussion and appended claims.

Briefly stated, the subject invention resides in a process which comprises sulfonating asphaltic material, dispersed in a normally liquid, inert, low-boiling paraffinic hydrocarbon, with liquid sulfur trioxide, neutralizing the resulting sulfonation mixture with a basic neutralizing agent, and recovering the resulting neutralized product.

The terms "asphalt" or "asphaltic material" as used in this specification and in the appended claims are meant to cover dark brown to black liquid, semi-solid or solid cementitious mixtures of hydrocarbons of natural or pyrogenous origin, or a combination of both, or fractions or components thereof, which are completely or substantially soluble in carbon disulfide, and wherein bitumens are the sole or predominent constituent. Naturally occurring or native asphalts useful in the practice of this invention include materials such as albertite, elaterite, gilsonite, grahamite, wurtzilite, Trinidad or Bermudez Lake asphalts, and the like. Pyrogenous asphalts useful in the practice of this invention include those obtained by refining petroleum by distillation, precipitation, cracking, oxidation, or similar operations, for example, distillation residues, still bottoms, cracked residues, straight-run residues, asphaltic bitumens, blown asphalt, and the like. Components or fractions of pyrogenous asphalts and naturally occurring asphalts representatively include asphaltenes, maltenes, carbenes, oily constituents, asphaltic resins, asphaltic acids and their anhydrides, and the like.

Asphalts having ring and ball softening points in the range of 115° F. to 260° F. are generally applicable in preparing the sulfonate, those having softening points in the range of 160° F. to 190° F. being even more preferred.

Especially useful asphaltic starting materials which can be used in the practice of this invention are the visbroken, vacuum reduced asphalts having ring and ball softening points in the range of about 135 to 250° F. which can be prepared, for example, by subjecting topped crude oil to alternate stages of vacuum reduction and vis-breaking. Typical asphaltic starting materials of this type will comprise 21 to 38 percent asphaltenes, 25 to 34 percent asphaltic resins, and 36 to 49 percent oily constituents, with ring and ball softening points in the range from 136 to 180° F. A specific example of a visbroken, vacuum reduced asphalt has 21.80 percent asphaltenes, 31.10 percent asphaltic resins, and 47.13 percent oil constituents, with a ring and ball softening point of 136° F.

The asphaltic charging stock used in this invention is dispersed and/or dissolved in a normally liquid, inert or non-sulfonatable, low-boiling, normal paraffinic hydrocarbon diluent or carrier, preferably having a total of 5 to 8 carbon atoms per molecule. Representative paraffinic hydrocarbons which can be used include pentane, hexane, heptane and octane. Paraffinic hydrocarbons having higher boiling points can be used but their use entails problems of recovery, and therefore are not especially useful. The asphaltic charging material can be heated above its oftening point to a flowable or pumpable consistency so as to aid its handling and dispersion in the paraffinic diluent. The asphaltic material can be mixed with the dried diluent in a suitable mixing device, such as a colloid mill, to produce asphaltic dispersions having an asphaltic concentration of about 15 to 50 weight percent, preferably 20 to 35 weight percent.

In the sulfonation process of this invention, the asphaltic dispersion is passed to a suitable sulfonation zone, such as a stirred, externally cooled reactor, where it is sulfonated in the liquid phase with liquid sulfur trioxide. Although I prefer to employ a sulfonating agent comprising liquid sulfur trioxide, and to directly contact the asphaltic dispersion with a controlled or step-wise addition of the sulfonating agent, I can also employ a sulfonating agent comprising liquid sulfur trioxide dispersed in a paraffinic diluent like that used in dispersing the asphaltic charging stock. The sulfonating agent is preferably introduced into the top of the sulfonation zone above the agitated asphaltic dispersion and allowed to drop thereon, or the sulfontaing agent can be bubbled into the asphaltic dispersion. The sulfonation reaction is practically instantaneous and exothermic. The temperature of the sulfonation reaction can be controlled by the controlled addition of the sulfonating agent and also by circulating a cooling medium in an external jacket surrounding the sulfonation reactor. The reaction mass is continuously agitated by means of paddles or the like, and the bottoms from the sulfonation reactor preferably are continuously withdrawn and recycled to the top of the reaction zone to insure complete and quick sulfonation.

Liquid sulfur trioxide is now commercially available and I prefer to use it in the gamma-form since in this form it is more readily handled and adapted to continuous or batch processes. An especially useful commerically available liquid sulfur trioxide is sold under the trade name "Sulfan," a stabilized gamma-form which is maintained in a stabilized liquid condition due to the presence of an inhibitor which maintains most of the sulfur trioxide in the monomeric form. The amount of liquid sulfur trioxide used in the sulfonation process of this invention can vary over a wide range and the amount employed will be dependent upon various factors, such as the nature of the asphaltic charging stock itself, the reactor employed, etc. Generally, the liquid sulfur trioxide sulfonating agent will be employed in amounts from about 10 to 100 pounds for each 100 pounds of asphaltic charging stock. In carrying out the subject invention in the laboratory, I have found that about 100 milliliters of liquid sulfur trioxide can be used to sulfonate about 300 grams of asphaltic charging stock. This amount of sulfonating agent is much lower than the amount of conventional sulfonating agents such as concentrated sulfuric acid and oleum used in sulfonating simple organic compounds.

The temperature of the sulfonation reaction can vary over a wide range and generally will be maintained in the range between about 45 and 140° F., preferably between 75 and 125° F. This sulfonation reaction is carried out under substantially anhydrous conditions so as to avoid the production of excess sulfuric acid in the reaction mass, the presence of this acid giving rise to problems of product recovery and purification. During the reaction, gases such as sulfur dioxide, sulfur trioxide, and vaporized diluent, together with small amounts of low molecular weight organic sulfonates, are produced and these can be vented from the reaction zone and passed to suitable recovery equipment, such as a sulfur dioxide knockout tank containing a caustic solution.

The effluent from the sulfonation zone will be a liquid dispersion, slurry, or gel, depending upon the nature of the asphaltic starting material and the degree of sulfonation. This sulfonation effluent will be relatively free of excess sulfonating agent and thus obviate separating excess sulfonating agent or sulfuric acid from the product. As such, the sulfonation effluent can be directly neutralized with a basic neutralizing agent, the amount of which is that necessary to neutralize the asphaltic sulfonic acid derivatives produced by the sulfonation reaction. Alternatively, in some cases, the sulfonation reaction mixture can be first preliminarily separated by filtration or the like into a sulfonic acid phase and a sludge phase containing unreacted starting material. Prior to the neutralization of the resulting sulfonic acids, excess sulfur dioxide can be removed from the reaction mixture in any convenient manner, for example by simple warming or stripping with air.

The sulfonic acids produced by the sulfonation reaction can be neutralized with a basic neutralizing agent such as anhydrous or aqueous ammonia, or an aqueous slurry or solution of an alkali metal or alkaline earth metal salt, oxide, or hydroxide, thereby converting the asphalt sulfonic acids to the corresponding ammonium or metal sulfonates. Metals which are particularly suitable for preparing the sulfonates of this invention include the alkali metals, such as sodium and potassium, and the alkaline earth metals such as magnesium, calcium, barium, and the like. The preferred neutralizing agent used in this invention is an aqueous caustic solution, for example aqueous sodium hydroxide having a concentration of 10 to 50 weight percent, preferably about 33 weight percent. The neutralizing agent can be added to the sulfonation zone or reactor after sulfonation is complete, or the sulfonation reaction mixture can be passed to a suitable holding vessel and neutralized there with the neutralizing agent. The sulfonation reaction mixture is neutralized to a pH of about 7 to 11, a slight excess of the neutralizing agent preferably being employed for this purpose. The neutralization step can be conveniently carried out over a wide temperature range, e.g., the temperature generated by the heat of neutralization, and at a pressure preferably sufficient to prevent evaporation of the volatile materials present. Repeated amounts of the neutralizing agent can be added so as to insure complete neutralization. Both before and after neutralization it may be desirable in some cases to strip off any sulfur dioxide remaining in the sulfonation mixtures. It is also within the scope of this invention to use a combination of neutralizing agents, for example, the sulfonic acids can be first neutralized with anhydrous ammonia and then with sodium hydroxide, or first sodium hydroxide and then anhydrous ammonia. After neutralization, the pH of the neutralized mixture can be adjusted. The neutralized mixture can be allowed to settle and then separated, for example by decantation, centrifugation, filtration, or the like, to separate the sulfonate from any sludge or other unreacted material that may be present.

Following neutralization, the diluent can be separated from the neutralized mixture by any simple procedure, for example, by distilling off the diluent, or it can be accomplished by extraction, simple heating, or stripping with air. Preferably, the neutralized sulfonation mixture is subjected to a flashing operation by introducing the neutralized mixture into a flash drier maintained under a reduced pressure in order to vaporize the diluent and the volatile non-sulfonated material from the neutralized mixture. The heat of neutralization may be sufficient to raise the temperature of the neutralized mixture to a flashing temperature, but in some cases it may be necessary to heat the neutralized mixture, for example by indirectly heat exchanging it with steam. The vaporized diluent can be passed from the flash drier to suitable recovery equipment and the condensed diluent recycled to the process. Alternatively, a suitable drum drier can be employed wherein the neutralized mixture is poured onto a rotating heated drum, the vaporized diluent being recovered and the neutralized product being scraped or raked off the heated drum.

The sulfonated product can be dried to any suitable moisture content, the latter depending upon the use to which the neutralized product is made. For example, when the neutralized product is to be used as an additive for controlling the fluid loss of drilling muds, it can be dried to a moisture content of about 0.1 to 10 percent, and when used as a fluid loss control additive in fracturing fluids it can be dried to a moisture content of from about 10 to 30 percent, preferably about 14 to 18 percent.

The neutralized product will generally be brown to dark black and will have a friable consistency; it will also be relatively neutral. The product can be ground to any desired particle size and bagged.

The sulfonated asphalt products of this invention have a wide range of dispersibility in water and oil, the particular degree of dispersibility being dependent on the nature of the asphaltic starting material, the degrees of sulfonation and neutralization, etc. Generally these sulfonated asphalt products have portions which are soluble in water, portions which are soluble in oil, and portions which are insoluble in both. A typical product of this invention, the sodium salt of asphaltic sulfonic acids, was found to be 30.4 weight percent soluble in kerosene and 69.6 weight percent insoluble in kerosene; 7.2 weight percent of this product was solids insoluble in kerosene and having a particle size below 2 microns, with the balance of the kerosene-insoluble solids having a particle size greater than 2 microns. The oil-insoluble portion of this product did not form a gelationus precipitate when dispersed in kerosene to which a small amount (33 weight percent) of water was added.

The following examples will further illustrate the objects and advantages of this invention, but it is to be understood that the various amounts, treating conditions, etc., recited in these examples are merely illustrative of preferred embodiments and should not be construed to unduly limit this invention.

*Example I*

Three hundred grams of vacuum reduced asphalt having a ring and ball softening point of 185° F. were dispersed in about one liter of n-hexane, and the mixture transferred to a two-liter stainless steel reactor. The mixture was cooled in a circulating water bath and liquid sulfur trioxide was added drop-wise to the well-stirred mixture at a rate of approximately 2 millimeters per minute. After all of the sulfonating agent had been added, the stirred mixture was allowed to react for approximately 30 minutes. A 40 percent aqueous sodium hydroxide neutralizing solution was then added to the stirred mixture in an amount equivalent to one gram of sodium hydroxide for each milliliter of sulfur trioxide used. The neutralized product was then vacuum distilled in a boiling water bath and was dried in a vacuum oven. The dry, solid sulfonated asphalt was then ground to pass through a 16 mesh sieve.

*Example II*

Forty pounds of a vacuum reduced asphalt having a ring and ball softening point of 185° F. were dissolved in 24 gallons of n-heptane with heat and stirring. The dispersion was cooled to 50° F. and then 27 pounds of liquid sulfur trioxide were added at the rate of one pound every five minutes. During the addition of the sulfonating agent, the reaction pot was cooled with a glycol jacket at 40° F. The sulfonated mixture was then neutralized with 14 pounds of sodium hydroxide dissolved in 17 pounds of water, the neutralizing agent being added step-wise over a 20 minute period. The neutralized mixture was then transferred to a drum dryer and heated in a water bath to drive off most of the solvent. The solid sulfonated asphalt product was then dried in a vacuum oven and ground to pass through a ¼ inch mesh sieve.

*Example III*

A visbroken, vacuum reduced asphalt having a ring and ball softening point of 168° F. was dispersed in a colloid mill with n-hexane. One hundred gallons of the asphalt dispresion, having an asphalt concentration of 26.2 weight percent asphalt, or 1.64 pounds of asphalt per gallon of dispersion, were charged to a stirred, water-jacketed reactor and sulfonated with 105 pounds of liquid sulfur trioxide (Sulfan), the sulfonating agent being introduced step-wise over a period of several hours into the top of the reactor where it was allowed to drop into the agitated dispersion. Bottoms from the reactor were continuously withdrawn and circulated to the top of the reactor. The average temperature of the sulfonation reaction was 75° F. with the maximum temperature attained being 79° F. Following sulfonation, the reaction products were neutralized with 80 pounds of a 50 weight percent aqueous caustic solution added step-wise to the top of the reactor over a period of 30 minutes. The maximum temperature during neutralization was 125° F. and the pH of the resulting neutralized product was pH 10. The neutralized mixture was then heated and flashed in a vacuum flash dryer to remove the hexane diluent and other vaporized products. The resulting black, friable product, the sodium salt of asphaltic sulfonic acids, amounted to 195 pounds and had a pH of 12 and a moisture content of 18.6 percent.

*Example IV*

A visbroken, vacuum reduced asphalt having a ring and ball softening point of 174° F. was sulfonated in a manner similar to that described in Example II. In this example, 100 gallons of the asphalt-hexane dispersion, having an asphalt concentration of 32.4 weight percent, or 2.04 pounds of asphalt per gallon of dispersion, were sulfonated with 131 pounds of liquid sulfur trioxide, added step-wise to the reactor. The average temperature during sulfonation was 115° F. The sulfonation reaction mixture was neutralized with 98 pounds of 50 weight percent aqueous caustic solution, the maximum temperature during neutralization being 126° F. Neutralized product was flashed to remove solvent, and the dried sulfonated asphalt product recovered had a pH of 7 and a moisture content of 27.6 percent.

*Example V*

A visbroken, vacuum reduced asphalt having a ring and ball softening point of 180° F. was sulfonated in a manner similar to that of Examples III and IV. In this example, 100 gallons of the asphalt-hexane dispersion, having an asphalt concentration of 31.2 weight percent, or 1.97 pounds of asphalt per gallon of dispersion, were sulfonated with 126 pounds of liquid sulfur trioxide. The average temperature during sulfonation was 65° F., with a maximum temperature of 67° F. Following sulfonation, the reaction mixture was neutralized with 110 pounds of 50 weight percent caustic solution added over a period of 3 hours. During neutralization the maximum temperature was 113° F. The neutralized product was then flashed to remove excess solvent, and the dried sulfonated asphalt product amounted to 595 pounds with a moisture content of 16 percent.

Various modifications and alterations of this invention will become apparent to those skilled in the art from the foregoing discussions, and it should be apparent that the subject invention is not to be unduly limited to that set forth hereinbefore for illustrative purposes.

I claim:
1. A process for making sulfonated asphalt, comprising dispersing asphaltic material in a normally liquid, inert, low-boiling paraffinic hydrocarbon diluent having from 5 to 8 carbon atoms per molecule, contacting the resulting dispersion of asphaltic material with a sulfonating agent consisting essentially of liquid sulfur trioxide under anhydrous conditions, neutralizing the resulting sulfonic acids with a basic neutralizing agent selected from the group consisting of ammonia and alkali metal and alkaline earth metal salts, oxides, and hydroxides, separating said diluent from the resulting neutralized sulfonic acids, and drying the resulting separated sulfonated asphalt as the product of the process.

2. A process for making sulfonated asphalt, comprising dispersing asphaltic material in a normally liquid, inert, low-boiling paraffinic hydrocarbon diluent having from 5 to 8 carbon atoms per molecule sulfonating the resulting dispersion of asphaltic material at a temperature in the range of about 45 to 140° F. with a sulfonating agent consisting essentially of liquid sulfur trioxide under anhydrous conditions, the amount of said liquid sulfur trioxide employed being in the range of about 10 to 100 pounds for each 100 pounds of said asphaltic material, neutralizing the resulting sulfonic acids with a basic neutralizing agent selected from the group consisting of ammonia and alkali metal and alkaline earth metal salts, oxides, and hydroxides, separating said diluent from the resulting neutralized sulfonic acids, and drying the resulting separated sulfonated asphalt as the product of the process.

3. The process according to claim 2 wherein said asphaltic material is a visbroken, vacuum reduced asphalt.

4. The process according to claim 2 wherein said asphaltic material is a visbroken, vacuum reduced asphalt having a ring and ball softening point in the range of 135 to 200° F.

5. The process according to claim 2 wherein said asphaltic material is a visbroken, vacuum reduced asphalt having a ring and ball softening point in the range of 135 to 200° F., and comprises about 21 to 38 percent asphaltenes, 25 to 34 percent oily constituents, and 36 to 34 percent asphaltic resins.

6. The process according to claim 2 wherein said dispersion has an asphaltic concentration in the range of about 15 to 50 weight percent.

7. The process according to claim 2 wherein said step of separating said diluent from the neutralized sulfonic acids is accomplished by vacuum flashing.

8. A process for making sulfonated asphalt, comprising dispersing asphaltic material in a normally liquid, inert, low-boiling hydrocarbon diluent having 5 to 8 carbon atoms per molecule to provide a dispersion having an asphaltic concentration in the range of about 20 to 35 weight percent, sulfonating said asphaltic material by contacting said dispersion with a sulfonating agent consisting essentially of about 10 to 100 pounds of liquid sulfur trioxide for each 100 pounds of asphaltic material at a temperature in the range of about 75 to 125° F. under anhydrous conditions, neutralizing the resulting sulfonic acids with a basic neutralizing agent comprising aqueous sodium hydroxide, separating said diluent from the resulting neutralized sulfonic acids, and drying the resulting separated sulfonated asphalt as the product of the process.

References Cited in the file of this patent

UNITED STATES PATENTS

| | | |
|---|---|---|
| 2,748,057 | Goren | May 29, 1956 |
| 2,911,373 | Goren et al. | Nov. 3, 1959 |
| 3,006,846 | Stratton | Oct. 31, 1961 |

OTHER REFERENCES

Asphalts and Allied Substances, by Abraham, pp. 135 and 136, vol. I, 5th ed. D. Van Nostrand Co., Inc., New York, 1945.